United States Patent
Bai

(10) Patent No.: US 10,749,562 B2
(45) Date of Patent: Aug. 18, 2020

(54) MULTIWAY SWITCH, RADIO FREQUENCY SYSTEM, AND WIRELESS COMMUNICATION DEVICE

(71) Applicant: Guangdong Oppo Mobile Telecommunications Corp., Ltd., Dongguan, Guangdong (CN)

(72) Inventor: Jian Bai, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/183,718

(22) Filed: Nov. 7, 2018

(65) Prior Publication Data
US 2019/0288735 A1   Sep. 19, 2019

(30) Foreign Application Priority Data

Mar. 16, 2018 (CN) .......................... 2018 1 0220153

(51) Int. Cl.
*H04B 1/40* (2015.01)
*H04B 1/00* (2006.01)
(Continued)

(52) U.S. Cl.
CPC .............. *H04B 1/40* (2013.01); *H04B 1/005* (2013.01); *H04B 1/44* (2013.01); *H04B 7/0404* (2013.01);
(Continued)

(58) Field of Classification Search
CPC ... H04B 1/00; H04B 1/28; H04B 1/38; H04B 1/40; H04B 1/44; H04B 1/48;
(Continued)

(56) References Cited

U.S. PATENT DOCUMENTS 4,318,104 A * 3/1982 Enein ................ H01Q 3/40
  342/372
4,686,533 A * 8/1987 MacDonald ............ H01Q 3/26
  342/371
(Continued)

FOREIGN PATENT DOCUMENTS

CN    101867402 A    10/2010
CN    202103661 U    1/2012
(Continued)

OTHER PUBLICATIONS

International search report issued in corresponding international application No. PCT/CN2018/112702 dated Feb. 1, 2019.
(Continued)

*Primary Examiner* — James M Perez

(57) ABSTRACT

A multiway switch, a radio frequency system, and a wireless communication device are provided. The multiway switch is applicable to a wireless communication device being operable in a single-frequency single-transmit mode. The multiway switch includes five T ports and $2^n$ P ports. The five T ports are configured to be coupled with a radio frequency circuit. The $2^n$ P ports are configured to be coupled with an antenna system comprising $2^n$ antennas. The five T ports include one first T port coupled with all of the $2^n$ P ports. The multiway switch is configured to be coupled with the radio frequency circuit and the antenna system to implement a preset function of the wireless communication device of transmitting a sounding reference signal (SRS) through $2^n$ antennas corresponding to the $2^n$ P ports in turn.

14 Claims, 11 Drawing Sheets

(51) Int. Cl.
*H04B 7/0404* (2017.01)
*H04B 7/06* (2006.01)
*H04B 1/44* (2006.01)
*H04Q 3/00* (2006.01)
*H01Q 7/00* (2006.01)

(52) U.S. Cl.
CPC .............. *H04B 7/0686* (2013.01); *H04Q 3/00* (2013.01); *H04Q 3/0004* (2013.01); *H01Q 7/00* (2013.01); *H04Q 2213/1302* (2013.01)

(58) Field of Classification Search
CPC ........ H04B 1/005; H04B 1/006; H04B 1/401; H04B 1/403; H04B 7/08; H04B 7/108; H04B 7/185; H04B 7/0413; H04B 7/0404; H04B 7/0602; H04B 7/0686; H04B 7/18582; H04B 7/18584; H01Q 7/00; H04L 5/14; H04L 25/0228; H04W 36/00; H04W 36/34; H04W 36/0027; H04W 40/16; H04W 52/52; H04W 72/12; H04W 88/02; H04W 88/06
See application file for complete search history.

(56) References Cited

U.S. PATENT DOCUMENTS

| | | | | |
|---|---|---|---|---|
| 4,731,614 A * | 3/1988 | Crane | | H01Q 3/42 342/372 |
| 5,353,032 A * | 10/1994 | Bertocchi | | G01S 1/48 342/372 |
| 5,434,575 A * | 7/1995 | Jelinek | | H01Q 21/062 342/365 |
| 5,952,964 A * | 9/1999 | Chan | | H01Q 3/22 342/368 |
| 6,005,515 A * | 12/1999 | Allen | | H01Q 3/40 342/368 |
| 6,181,276 B1 * | 1/2001 | Schlekewey | | H04W 16/28 342/372 |
| 6,522,897 B1 * | 2/2003 | Martek | | H01Q 1/246 455/561 |
| 7,277,679 B1 * | 10/2007 | Barratt | | H04B 7/084 375/347 |
| 7,633,357 B2 * | 12/2009 | Hangai | | H01P 1/15 333/103 |
| 7,680,461 B2 * | 3/2010 | Takano | | H04B 7/0615 370/328 |
| 8,036,148 B2 * | 10/2011 | Fukamachi | | H04B 1/44 370/282 |
| 8,073,068 B2 * | 12/2011 | Kim | | H04W 52/42 375/267 |
| 8,189,649 B2 * | 5/2012 | Yuda | | H04B 17/21 375/219 |
| 8,457,026 B1 * | 6/2013 | Ho | | H04B 7/0617 342/359 |
| 8,649,418 B1 * | 2/2014 | Negus | | H04B 7/0486 375/211 |
| 8,743,754 B2 * | 6/2014 | Jung | | H04B 7/0602 370/310 |
| 9,214,981 B1 * | 12/2015 | Park | | H01Q 1/246 |
| 9,252,828 B2 * | 2/2016 | Frenger | | H04W 52/0206 |
| 9,813,269 B1 * | 11/2017 | Yoon | | H04B 1/40 |
| 9,831,940 B2 * | 11/2017 | Patel | | H04B 7/18584 |
| 9,847,802 B1 * | 12/2017 | Farley | | H04B 1/16 |
| 9,913,129 B2 * | 3/2018 | So | | H01Q 3/08 |
| 10,075,199 B2 * | 9/2018 | King | | H04B 1/006 |
| 10,355,738 B1 * | 7/2019 | Bai | | H04B 1/44 |
| 10,389,401 B1 * | 8/2019 | Bai | | H03K 17/6871 |
| 10,419,040 B1 * | 9/2019 | Bai | | H04B 1/44 |
| 10,439,851 B2 * | 10/2019 | Novak | | H04L 27/14 |
| 10,454,508 B2 * | 10/2019 | Bai | | H04B 1/44 |
| 10,454,550 B2 * | 10/2019 | Bai | | H04L 5/0048 |
| 10,491,288 B2 * | 11/2019 | Zhu | | H04B 7/0617 |
| 10,505,578 B2 * | 12/2019 | Bai | | H04Q 3/00 |
| 10,554,243 B2 * | 2/2020 | Bai | | H04B 1/40 |
| 10,554,244 B2 * | 2/2020 | Bai | | H04B 7/0413 |
| 10,560,130 B2 * | 2/2020 | Bai | | H04B 1/401 |
| 10,560,137 B2 * | 2/2020 | Bai | | H04B 1/005 |
| 10,567,027 B2 * | 2/2020 | Bai | | H04B 1/005 |
| 10,567,028 B2 * | 2/2020 | Bai | | H04B 7/0686 |
| 10,567,029 B2 * | 2/2020 | Bai | | H04B 1/005 |
| 10,574,285 B2 * | 2/2020 | Bai | | H04B 1/005 |
| 10,623,027 B2 * | 4/2020 | Bai | | H04B 7/0404 |
| 10,644,730 B2 * | 5/2020 | Bai | | H01Q 5/45 |
| 10,651,875 B2 * | 5/2020 | Bai | | H01Q 1/243 |
| 2004/0121753 A1 * | 6/2004 | Sugar | | H04B 1/006 455/333 |
| 2004/0192218 A1 * | 9/2004 | Oprea | | H04L 25/03343 455/73 |
| 2004/0196813 A1 * | 10/2004 | Ofek | | H01Q 21/065 370/334 |
| 2004/0196834 A1 * | 10/2004 | Ofek | | H01Q 21/065 370/352 |
| 2006/0193396 A1 * | 8/2006 | Li | | H04L 1/02 375/267 |
| 2008/0117999 A1 * | 5/2008 | Kadous | | H04B 7/0632 375/267 |
| 2008/0247364 A1 * | 10/2008 | Kim | | H04B 7/0671 370/336 |
| 2008/0285670 A1 * | 11/2008 | Walton | | H04L 1/0606 375/260 |
| 2009/0054093 A1 * | 2/2009 | Kim | | H04L 25/0208 455/500 |
| 2009/0175374 A1 * | 7/2009 | Seki | | H04L 1/08 375/260 |
| 2009/0180403 A1 * | 7/2009 | Tudosoiu | | H04B 1/0483 370/278 |
| 2009/0180466 A1 * | 7/2009 | Soul | | H03J 7/04 370/350 |
| 2010/0002345 A1 * | 1/2010 | Young | | H01L 27/0255 361/56 |
| 2010/0234035 A1 * | 9/2010 | Fujishima | | H04L 5/0035 455/450 |
| 2011/0243037 A1 * | 10/2011 | Sundstrom | | H04B 7/15542 370/279 |
| 2011/0250926 A1 * | 10/2011 | Wietfeldt | | H01Q 9/14 455/525 |
| 2012/0236955 A1 * | 9/2012 | Zhou | | H04B 7/0802 375/267 |
| 2012/0287887 A1 * | 11/2012 | Jung | | H04B 7/0602 370/329 |
| 2013/0021113 A1 * | 1/2013 | Bakalski | | H04B 1/18 333/176 |
| 2013/0083757 A1 * | 4/2013 | Kakishima | | H04B 7/0417 370/329 |
| 2013/0114468 A1 * | 5/2013 | Hui | | H04B 17/345 370/277 |
| 2013/0121342 A1 * | 5/2013 | Kim | | H04B 7/0617 370/436 |
| 2013/0222183 A1 * | 8/2013 | Lin | | H01Q 3/42 342/372 |
| 2013/0273856 A1 * | 10/2013 | Park | | H04B 7/0404 455/73 |
| 2013/0308554 A1 * | 11/2013 | Ngai | | H04B 1/44 370/329 |
| 2013/0322309 A1 * | 12/2013 | Smith | | H04L 5/14 370/281 |
| 2013/0335160 A1 * | 12/2013 | Khlat | | H01P 1/15 333/103 |
| 2014/0227982 A1 * | 8/2014 | Granger-Jones | | H04B 1/0064 455/77 |
| 2014/0294111 A1 * | 10/2014 | Zhang | | H04W 52/325 375/267 |
| 2015/0295595 A1 * | 10/2015 | Uejima | | H04B 7/04 455/78 |
| 2015/0312919 A1 * | 10/2015 | Lee | | H04L 1/0003 370/252 |
| 2015/0340769 A1 * | 11/2015 | Desclos | | H01Q 5/335 343/745 |

(56) References Cited

U.S. PATENT DOCUMENTS

| | | | |
|---|---|---|---|
| 2015/0381246 A1* | 12/2015 | Huang | H04L 5/0094 370/329 |
| 2016/0065206 A1* | 3/2016 | Ho | H04L 25/0266 455/83 |
| 2016/0183099 A1* | 6/2016 | Frenger | H04W 52/0206 370/311 |
| 2016/0337025 A1* | 11/2016 | Xu | H04B 7/0805 |
| 2017/0063344 A1* | 3/2017 | Broyde | H01Q 5/50 |
| 2017/0063404 A1* | 3/2017 | Langer | H04B 1/0057 |
| 2017/0063412 A1* | 3/2017 | Ripley | H04B 1/18 |
| 2017/0111066 A1* | 4/2017 | King | H04W 24/02 |
| 2017/0155444 A1* | 6/2017 | Patel | H04W 40/16 |
| 2017/0195004 A1* | 7/2017 | Cheng | H04B 7/0602 |
| 2017/0338839 A1* | 11/2017 | Little | H04B 1/56 |
| 2017/0373368 A1* | 12/2017 | Srirattana | H01P 5/18 |
| 2018/0069314 A1* | 3/2018 | Arfaei Malekzadeh | H01Q 1/241 |
| 2018/0084586 A1* | 3/2018 | McCoy | H04B 7/0452 |
| 2018/0152955 A1* | 5/2018 | Park | H04W 72/1215 |
| 2018/0191774 A1* | 7/2018 | Liang | G06F 21/554 |
| 2018/0205413 A1* | 7/2018 | Patel | H03F 1/56 |
| 2018/0227960 A1* | 8/2018 | Belghoul | H04W 36/0022 |
| 2019/0097715 A1* | 3/2019 | Maldonado | H04B 7/0811 |
| 2019/0140706 A1* | 5/2019 | Chang | H04W 24/02 |
| 2019/0253214 A1* | 8/2019 | Liu | H04L 5/0051 |
| 2019/0267956 A1* | 8/2019 | Granger-Jones | H03F 3/68 |
| 2019/0288389 A1* | 9/2019 | Bai | H04Q 3/0004 |
| 2019/0288714 A1* | 9/2019 | Bai | H04B 1/44 |
| 2019/0288715 A1* | 9/2019 | Bai | H04B 7/0404 |
| 2019/0288716 A1* | 9/2019 | Bai | H01Q 5/50 |
| 2019/0288717 A1* | 9/2019 | Bai | H03F 3/189 |
| 2019/0288719 A1* | 9/2019 | Bai | H04L 5/0048 |
| 2019/0288729 A1* | 9/2019 | Bai | H04B 1/40 |
| 2019/0288732 A1* | 9/2019 | Bai | H04B 1/40 |
| 2019/0288734 A1* | 9/2019 | Bai | H04B 1/40 |
| 2019/0288735 A1* | 9/2019 | Bai | H04B 1/005 |
| 2019/0288736 A1* | 9/2019 | Bai | H04Q 3/00 |
| 2019/0288754 A1* | 9/2019 | Bai | H04B 1/44 |
| 2019/0289606 A1* | 9/2019 | Negus | H04L 27/38 |
| 2019/0377075 A1* | 12/2019 | Tsfati | H04B 17/00 |
| 2020/0028556 A1* | 1/2020 | Inoue | H04B 7/088 |

FOREIGN PATENT DOCUMENTS

| | | |
|---|---|---|
| CN | 103905104 A | 7/2014 |
| CN | 105245295 A | 1/2016 |
| CN | 106209048 A | 12/2016 |
| CN | 108199725 A | 6/2018 |
| CN | 108199728 A | 6/2018 |
| CN | 108462506 A | 8/2018 |
| WO | 2017212287 A1 | 12/2017 |

OTHER PUBLICATIONS

Extended European search report issued in corresponding European application No. 18204578.1 dated May 28, 2019.

Gao Xiang et al: "Multi-Switch for Antenna Selection in Massive MIMO", 2015 IEEE Global Communications Conference (GLOBECOM), IEEE, Dec. 6, 2015 (Dec. 6, 2015), pp. 1-6, XP032872922, DOI: 10.1109/GLOCOM.2014.7417765 [retrieved on Feb. 23, 2016] sections I, III.B, III.C; figures 1, 2, 6.

Lemieux G et al: "Generating Highly-Routable Sparse Crossbars for PLDS", FPGA'OO. ACM/SIGDA International Symposium on Field Programmable Gate Arrays. Monterey, CA, Feb. 9-11, 20; [ACM/SIGDA International Symposium on Field Programmable Gate Arrays], New York, NY : ACM, US, vol. CONF. 8, Jan. 1, 2000 (Jan. 1, 2000), pp. 155-164, XP0806016Q, DOI: 10.1145/329166. 329199; ISBN: 978-1-58113-193-2; section 2; figure 1.

* cited by examiner

MULTIWAY SWITCH, RADIO FREQUENCY SYSTEM, AND WIRELESS COMMUNICATION DEVICE

CROSS-REFERENCE TO RELATED APPLICATION(S)

This application claims priority to Chinese Patent Application No. 201810220153.5, filed on Mar. 16, 2018, the entire disclosure of which is hereby incorporated by reference.

TECHNICAL FIELD

This disclosure relates to the field of mobile terminal technology, and particularly to a multiway switch, a radio frequency system, and a wireless communication device.

BACKGROUND

With the widespread use of electronic devices such as smart phones, the smart phone can support an increasing number of applications and is becoming more and more powerful. The smart phone is developing in a diversified and personalized way, becoming indispensable electronic products in users' life. In the fourth generation (4G) mobile communication system, the electronic device generally adopts a single-antenna or dual-antenna radio frequency (RF) system architecture. Currently, in a new radio (NR) system of the fifth generation (5G) mobile communication system, an electronic device supporting a four-antenna RF system architecture is proposed.

SUMMARY

Implementations of the disclosure provide a multiway switch, a radio frequency system, and a wireless communication device.

According to a first aspect of implementations of the disclosure, a multiway switch is provided. The multiway switch is applicable to a wireless communication device. The wireless communication device is operable in a single-frequency single-transmit mode. The multiway switch includes five T ports and $2^n$ P ports. The five T ports are configured to be coupled with a radio frequency circuit. The $2^n$ P ports are configured to be coupled with an antenna system including $2^n$ antennas. The five T ports include one first T port coupled with all of (that is, fully coupled with) the $2^n$ P ports. n is an integer and n≥2.

The multiway switch is configured to be coupled with the radio frequency circuit and the antenna system to implement a preset function of the wireless communication device. The preset function is a function of transmitting a sounding reference signal (SRS) through the $2^n$ antennas corresponding to the $2^n$ P ports in turn.

According to a second aspect of implementations of the disclosure, a radio frequency system is provided. The radio frequency system includes an antenna system, a radio frequency circuit, and a multiway switch.

The multiway switch includes five T ports and $2^n$ P ports. The five T ports are configured to be coupled with the radio frequency circuit. The $2^n$ P ports are configured to be coupled with the antenna system. The five T ports include one first T port coupled with all of the $2^n$ P ports. n is an integer and n≥2.

The antenna system includes $2^n$ antennas.

The multiway switch is coupled with the radio frequency circuit and the antenna system to implement a preset function of the wireless communication device. The preset function is a function of transmitting an SRS through the $2^n$ antennas corresponding to the $2^n$ P ports in turn. n is an integer and n≥2.

According to a third aspect of implementations of the disclosure, a wireless communication device is provided. The wireless communication device includes an antenna system, a radio frequency circuit, and a multiway switch.

The multiway switch includes five T ports and $2^n$ P ports. The five T ports are configured to be coupled with the radio frequency circuit. The $2^n$ P ports are configured to be coupled with the antenna system. The five T ports include one first T port coupled with all of the $2^n$ P ports. n is an integer and n≥2.

The antenna system includes $2^n$ antennas.

The multiway switch is coupled with the radio frequency circuit and the antenna system to implement a preset function of the wireless communication device. The preset function is a function of transmitting an SRS through the $2^n$ antennas corresponding to the $2^n$ P ports in turn.

BRIEF DESCRIPTION OF THE DRAWINGS

To describe technical solutions in implementations of the present disclosure or in the related art more clearly, the following briefly introduces the accompanying drawings required for describing the implementations or the related art. Apparently, the accompanying drawings in the following description only illustrate some implementations of the present disclosure. Those of ordinary skill in the art may also obtain other drawings based on these accompanying drawings without creative efforts.

DETAILED DESCRIPTION

Figure 1A:
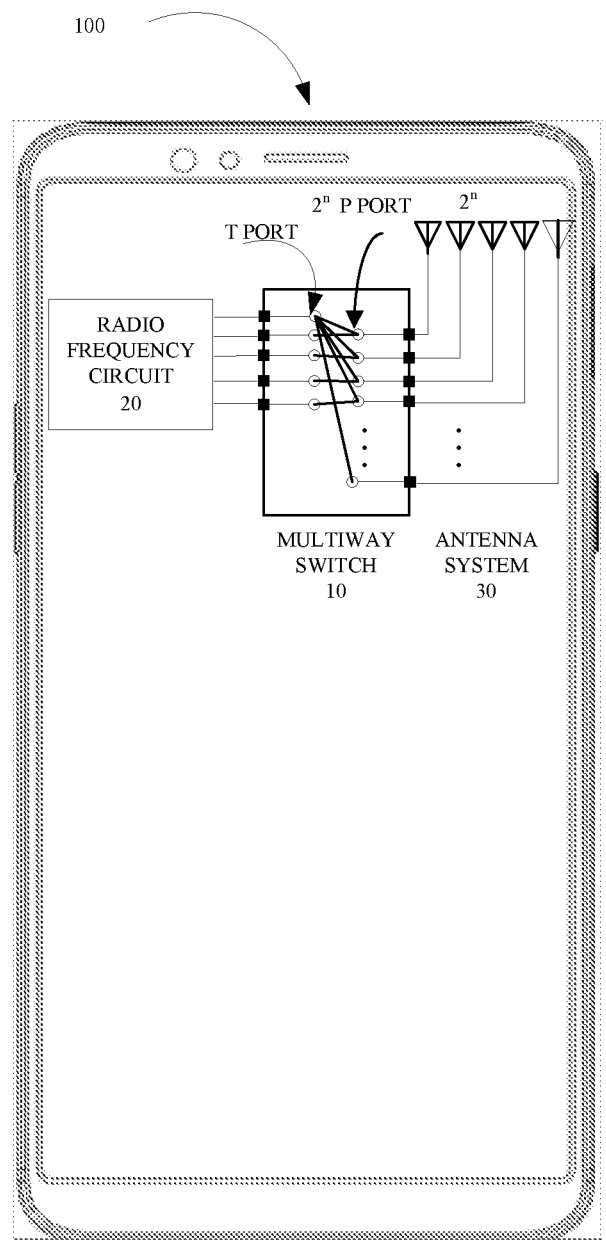
FIG. 1A is a schematic structural diagram illustrating a multiway switch according to an implementation of the disclosure.

In order to illustrate technical solutions of implementations of the present disclosure more clearly, technical solutions in implementations of the present disclosure will be described clearly and completely hereinafter with reference to the accompanying drawings described in the previous chapter. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or device can also be included.

The term "embodiment" or "implementation" referred to herein means that a particular feature, structure, or characteristic described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

The "electronic device" involved in the implementations of the present disclosure may include various handheld devices, in-vehicle devices, wearable devices, computing devices that have wireless communication functions or other processing devices connected to the wireless modem, as well as various forms of user equipments (UE), mobile stations (MS), terminal devices, and the like. For the convenience of description, the above-mentioned devices are collectively referred to as an electronic device.

In order to better understand a multiway switch and related products provided in the implementations of the present disclosure, the following implementations of the present disclosure will be described in detail.

At present, sounding reference signal (SRS) switching in four antennas of a mobile phone is a mandatory option for China mobile communications corporation (CMCC) in the China mobile fifth generation (5G) Scale Test Technical White Paper_Terminal, which is optional in the 3rd generation partnership project (3GPP). Its main purpose is for a base station to determine quality and parameters of four channels via measuring uplink signals of the four antennas of the mobile phone, to perform a beamforming of a downlink massive multi-input multi-output (MIMO) antenna array on the four channels according to a channel reciprocity, and finally to obtain the best data transmission performance for a downlink 4×4 MIMO.

In order to satisfy requirements of SRS switching in four antennas, implementations of the present disclosure provide a radio frequency architecture based on a simplified four-P-ports-and-n-T-ports (4PnT) antenna switch. In the implementations of the present disclosure, the 4PnT antenna switch is embodied as four-P-ports-and-five-T-ports (4P5T) antenna switch. In other implementations of the present disclosure, the 4PnT antenna switch can include other numbers of T ports, which is not limited herein. Compared with a 3P3T/DPDT/multiway small switch switching scheme, the present switching scheme can reduce the number of series switches in each path (all or part of switches are integrated into the 4P5T switch), thereby reducing link loss and optimizing the overall transmission and reception performance of the terminal. The implementations of the present disclosure are described in detail below.

The following describes some terms of the disclosure to facilitate understanding of those skilled in the art.

"P port" in the disclosure is the abbreviation of "pole port", which refers to ports coupled with antennas of the multiway switch. "T port" in the disclosure is the abbreviation of "throw port", which refers to ports coupled with radio frequency circuit of the multiway switch. The multiway switch is a 4P5T switch for example, that is, the four P ports are configured to be coupled with the antenna system and the five T ports are configured to be coupled with the radio frequency circuit. "Module" herein can refer to circuits and any combination of related components.

The concept of "coupling", "full coupling (fully coupled)", or other kinds of coupling between the T ports and the P ports of the multiway switch described in the implementations of the disclosure refers to a state in which the T ports are coupled with the P ports through first switch transistors. The concept of "full coupling" (fully coupled) of the T ports and the P ports of the multiway switch described in the implementations of the disclosure refers to a state in which the T ports are coupled with all of the P ports through first switch transistors. For example, a first T port is fully coupled with four P ports means the first T port is coupled with all of the four P ports. One T port or one P port may be one port of a second switch transistor. The first switch transistors are configured to control a unidirectional communication between the T ports and the P ports (including a unidirectional communication from the T ports to the P ports and a unidirectional communication from the P ports to the T ports). The first switch transistor can be, for example, a switch array including three metal-oxide-semiconductor (MOS) transistors. When the first switch transistor is disconnected and not grounded, parasitic parameters will greatly affect performance of other connected ports. Therefore, the first switch transistor is implemented with three MOS transistors, where the three MOS transistors can be in a common source connection, that is, coupled at a common source. When the first switch transistor is disconnected, two MOS transistors at two ends are disconnected and one MOS transistor in the middle is grounded. The second switch transistor is configured to enable a corresponding port (T port or P port) and can be, for example, a MOS transistor. The specific configurations of the first switch transistor and the second switch transistor are not limited herein. As one implementation, the wireless communication device can control paths between the T ports and the P ports to switch on through the first switch transistors. As one implementation, the wireless communication device can be provided with a dedicated controller to be coupled with switch transistors of the multiway switch.

The term "first T port" can also be named "one-to-all T port". The first T port (one-to-all T port) refers to a T port coupled with all of P ports. The term "second T port" can also be named "one-to-one T port". The first T port (one-to-all T port) refers to a T port coupled with a corresponding one P port.

The transmitting a sounding reference signal (SRS) through the four antennas corresponding to the four P ports in turn refers to a process in which the wireless communication device interacts with a base station based on polling mechanism to determine quality of an uplink channel corresponding to each antenna.

The "transmit-receive port", "transmit port", or "receive port" refers to a port (may be composed of one or more components) which implements a corresponding transmission and/or reception function and is located on the path of a transmitter circuit, on the path of a receive circuit, on the path of after a integration of one or more transmitter circuits and/or one or more receive circuits. It should be noted that the ports such as transmit ports, receive ports, and transmit-receive ports illustrated in the figures are exemplary and do not intent to indicate an exact port position and impose any restriction.

The following implementations of the present disclosure will be described in detail.

FIG. 1A is a schematic structural diagram illustrating a multiway switch 10 according to an implementation of the disclosure. The multiway switch 10 is applicable to a wireless communication device 100. In this implementation wireless communication device 100 can be embodied as a terminal device. The wireless communication device 100 is operable in a single-frequency single-transmit mode. The wireless communication device 100 includes the multiway switch 10, a radio frequency circuit 20 and an antenna system 30. The antenna system 30 includes $2^n$ antennas. The multiway switch 10 includes five T ports and $2^n$ P ports. The five T ports are configured to be coupled with the radio frequency circuit 20. The $2^n$ P ports are configured to be coupled with the $2^n$ antennas of the antenna system 30, in other words, the $2^n$ antennas and the $2^n$ P ports are coupled in one-to-one correspondence. The five T ports include one first T port coupled with all of the $2^n$ P ports (that is, one of the five T ports is coupled with all of the $2^n$ P ports). n is an integer and n≥2.

The multiway switch 10 is configured to be coupled with the radio frequency circuit 20 and the antenna system 30 to implement a preset function of the wireless communication device 100. The preset function is a function of transmitting an SRS through the four antennas corresponding to the four P ports in turn, which can be understood as a $2^n$-port SRS function.

The following describes the case where n=2, that is, four antennas and four P ports are configured, as an example. It is to be noted that, the number of the antennas and the P ports are not limited to 4, and the number thereof can be extended to $2^n$ (n being an integer and n≥2) in the implementations of the disclosure. In the case where $2^n$ antennas and $2^n$ P ports are configured, with regard to logical composition of the radio frequency circuit, physical composition of the radio frequency circuit, coupling between the independent circuit modules and the T ports, coupling between the T ports and the P ports, coupling between the P ports and the antennas, and the like, reference may be made in the following implementations. As for the principle of achieving the transmitting an SRS through the $2^n$ antennas in turn and the structure of simplified switch, reference may further be made to related descriptions in the following implementations.

Figure 1B:
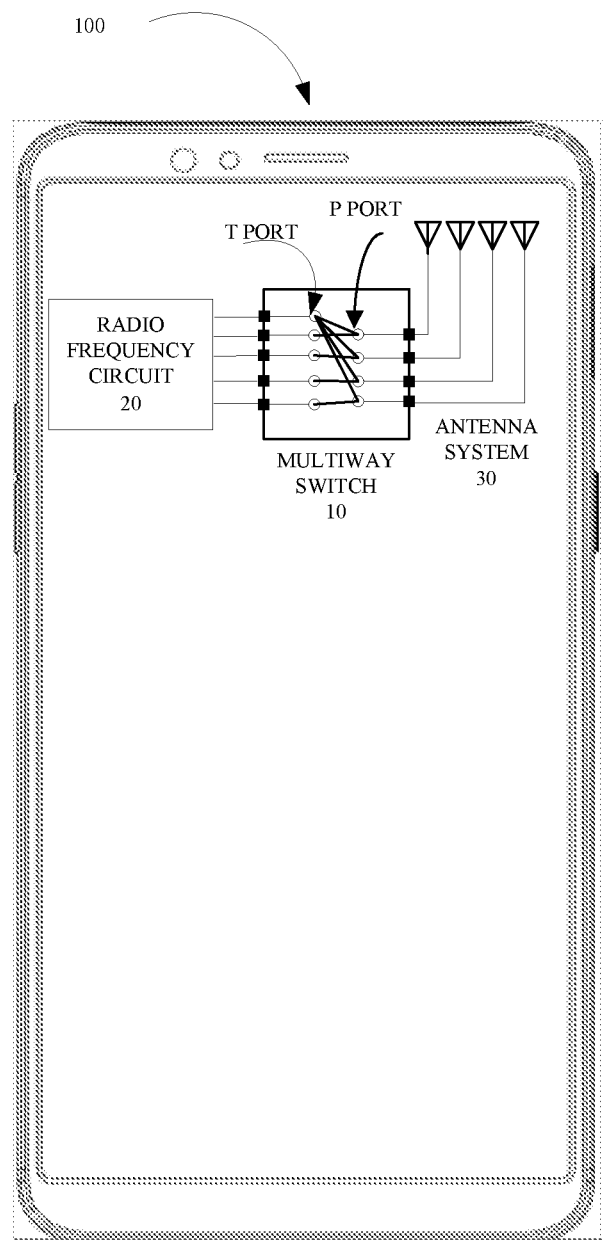
FIG. 1B is a schematic structural diagram illustrating a multiway switch according to an implementation of the disclosure.

FIG. 1B is a schematic structural diagram illustrating a multiway switch 10 according to an implementation of the disclosure. The multiway switch 10 is applicable to a wireless communication device 100. In this implementation wireless communication device 100 can be embodied as a terminal device. The wireless communication device 100 is operable in a single-frequency single-transmit mode. The wireless communication device 100 includes the multiway switch 10, a radio frequency circuit 20 and an antenna system 30. The antenna system 30 includes four antennas. The multiway switch 10 includes five T ports and four P ports. The five T ports are configured to be coupled with the radio frequency circuit 20. The four P ports are configured to be coupled with the four antennas of the antenna system 30, in other words, the four antennas and the four P ports are coupled in one-to-one correspondence. The five T ports include one first T port coupled with all of the four P ports (that is, one of the five T ports is coupled with all of the four P ports).

The multiway switch 10 is configured to be coupled with the radio frequency circuit 20 and the antenna system 30 to implement a preset function of the wireless communication device 100. The preset function is a function of transmitting an SRS through the four antennas corresponding to the four P ports in turn, which can be understood as a four-port SRS function.

As an implementation, the wireless communication device 100 may be a mobile phone or other terminal devices supporting the fifth generation new radio (5G NR), such as a customer premise equipment (CPE) or a mobile wireless-fidelity (MIFI).

The multiway switch 10 includes field-effect transistors (FET). As one T port of the five T ports are coupled with all of the four P ports, and each of other T ports is only coupled with one P port and further coupled with one fixed antenna for receiving via the one P port, the number of built-in FETs, volume, and cost of the 4P4T switch can be reduced and performance can be improved. Details will be described hereinafter.

Figure 2:
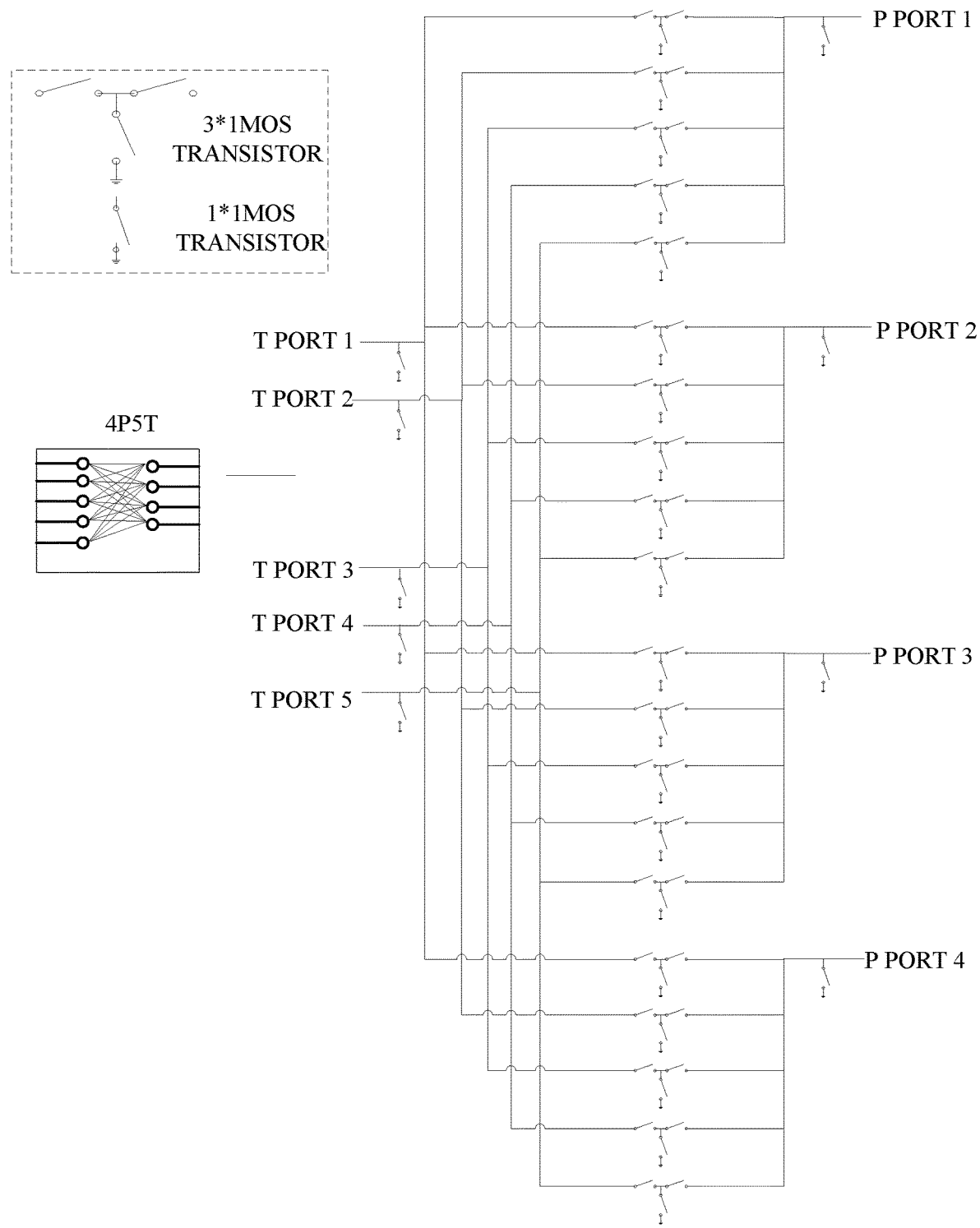
FIG. 2 is a schematic structural diagram illustrating a 4P4T full-coupling switch according to an implementation of the disclosure.
Figure 3:
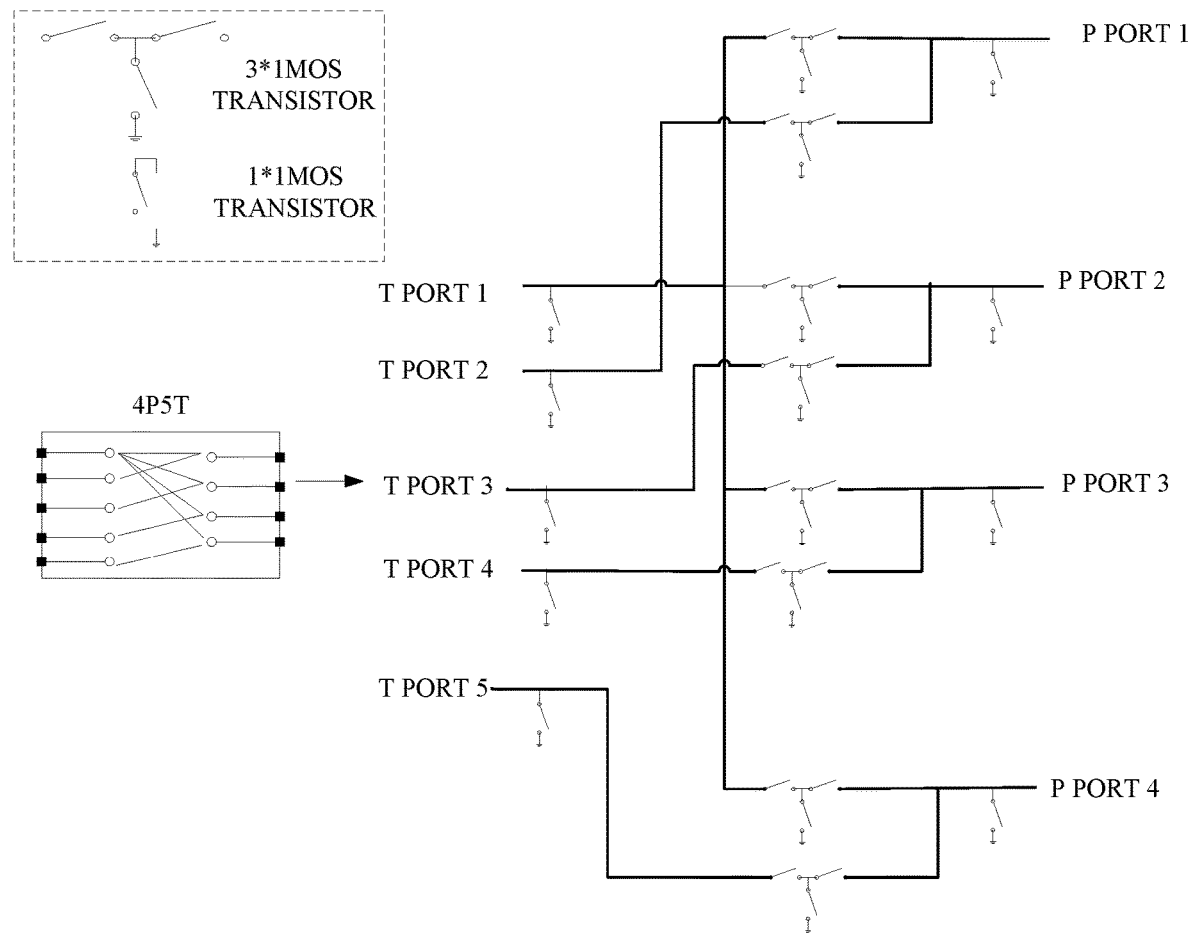
FIG. 3 is a schematic structural diagram illustrating a 4P4T simplified switch according to an implementation of the disclosure.

For example, among the five T ports, if each T port is coupled with all of the four P ports, as illustrated in FIG. 2 of a schematic structural diagram of the multiway switch 10, the number of the field-effect transistors of the multiway switch 10 is 5+5*4*3+4=69; if only one T port of the five T ports is coupled with all of the four P ports, as illustrated in FIG. 3 of a schematic structural diagram of the multiway switch 10, the number of the field-effect transistors of the multiway switch 10 is 5+(1*4+(5−1)*1)*3+4=33.

In addition, the wireless communication device 100 further includes a radio frequency transceiver. The radio frequency transceiver is coupled with the radio frequency circuit 20 and constitutes a radio frequency system of the wireless communication device 100 together with the radio frequency circuit 20, the multiway switch 10, and the antenna system 30.

By limiting the number of T ports that are coupled with all of the four P ports (in other words, full-coupling T ports), the number of switches of the radio frequency system of the wireless communication device can be effectively reduced. That is to say, the number of full-coupling T ports has a great influence on performance of the radio frequency system.

In the implementations of the present disclosure, the wireless communication device is operable in the single-frequency single-transmit mode.

The single-frequency single-transmit mode refers to an operating mode in which the wireless communication device 100 can support single frequency band-dual uplink (UL) transmit paths or single frequency band-four downlink (DL) receive paths to a maximum capability.

According to the implementations of the disclosure, the wireless communication device includes the antenna system, the radio frequency circuit, and the multiway switch. The antenna system includes the four antennas. The multiway switch includes the five T ports and the four P ports. One T port of the five T ports is coupled with all of the four P ports. The multiway switch is configured to be coupled with the radio frequency circuit and the antenna system to implement the preset function of the wireless communication device, and the preset function is a function of transmitting an SRS through the four antennas corresponding to the four P ports in turn.

As one implementation, the five T ports include one first T port and four second T ports. The one first T port is coupled with all of the four P ports. The four second T ports are coupled with the four P ports in one-to-one correspondence. The one first T port of the five T ports supports at least a transmission function and the four second T ports other than the one first T port of the five T ports support only a reception function.

In this implementation, since the multiway switch 10 includes the first T port and the second T ports and the number of the second T ports is not zero, compared with a configuration in which all T ports are coupled with all of P ports, for the multiway switch 10 provided herein, the number of switches is reduced. That is, the number of the switches in transmit paths and/or receive paths of the radio frequency system of the wireless communication device 100 can be reduced, thereby reducing path loss, improving transmit power/sensitivity, data transmission rate in the 5G NR, and uplink coverage and downlink coverage of the mobile phone, and reducing power consumption and cost.

As an implementation, the multiway switch 10 is composed of thirty-three FETs.

Figure 4A:
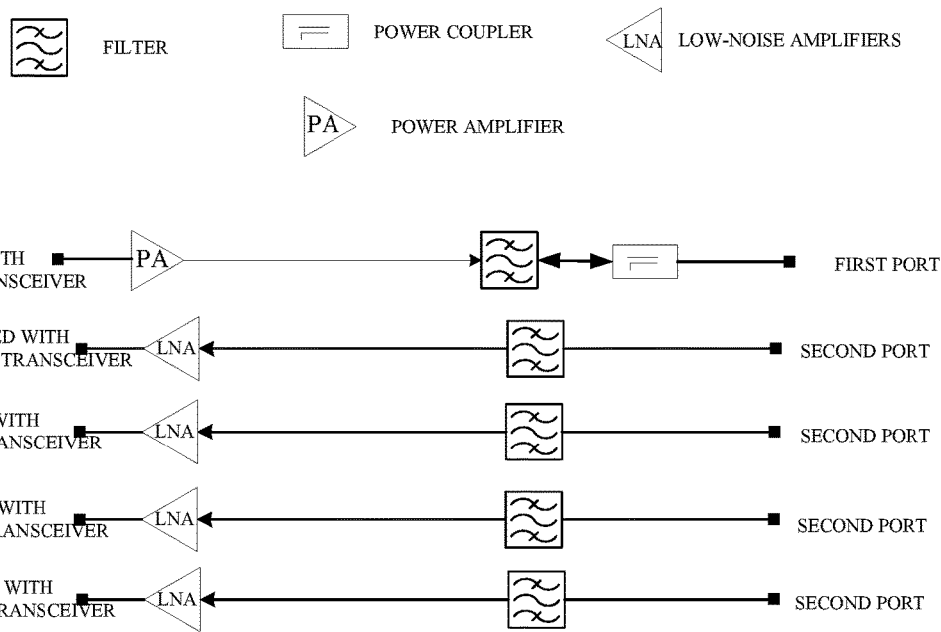
FIG. 4A is a schematic structural diagram illustrating a radio frequency circuit of a wireless communication device according to an implementation of the disclosure.
Figure 4B:
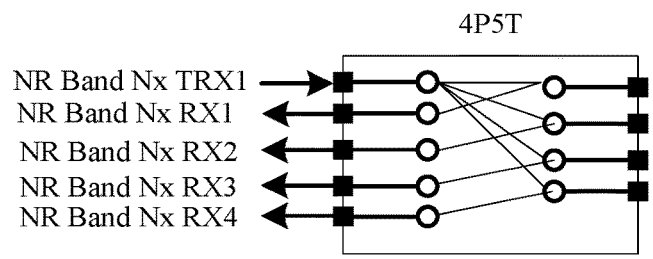
FIG. 4B is a schematic structural diagram illustrating a multiway switch of a wireless communication device according to an implementation of the disclosure.

In the case that the wireless communication device 100 is operable in the single-frequency single-transmit mode, as illustrated in FIG. 4A, FIG. 4A is a schematic structure of a corresponding radio frequency circuit 20, and the radio frequency circuit 20 of wireless communication device 100 logically includes four receiver circuits and one transmitter circuit. The radio frequency circuit 20 of the wireless communication device 100 corresponds to one first port and four second ports. As illustrated in FIG. 4B, FIG. 4B is a schematic structure of a corresponding multiway switch 10, the multiway switch 10 includes five T ports. The five T ports includes one first T port and four second T ports. The number of the field-effect transistors of the multiway switch 10 is 5+(1*4+(5−1)*1)*3+4=33. The first port is configured to be coupled with the first T port and the second port is configured to be coupled with the second T port. The one transmitter circuit logically corresponds to a first port that supports the transmission function and the first port is coupled with one first T port of the multiway switch 10. In addition, the four receiver circuits correspond to four second ports (in one-to-one correspondence). Each of the four second ports only supports the reception function, and each of the four second ports is coupled with one second T port of the multiway switch 10. The specific configuration of the transmitter circuit and the receiver circuit, and definitions related to the multiway switch 10 are similar to the foregoing implementations and will not be described herein again. In addition, it can be understood that, the matching manner of the above radio frequency circuit 20 and the multiway switch 10 includes but is not limited to the structure of the drawing, which is merely an example herein.

The multiway switch 10 of the implementation of the disclosure can enable the wireless communication device 100 to be operable in the single-frequency single-transmit mode. It is beneficial to simplifying the RF architecture of the wireless communication device supporting four-port SRS switching in the 5G NR, reducing the number of switches in transmit paths and receive paths and reducing path loss, thereby improving transmit power/sensitivity, data transmission rate in the 5G NR, and uplink coverage and downlink coverage of the mobile phone, and reducing power consumption.

As an implementation, the radio frequency circuit 20 of the wireless communication device 100 logically includes one transmitter circuit (can be comprehended as a circuit for transmitting and/or processing signals) and four receiver circuits (can be comprehended as a circuit for receiving and/or processing signals).

The radio frequency circuit 20 physically includes one independent circuit module.

The one independent circuit module has one transmit port which is configured to be coupled with the one first T port. The independent circuit module has receive ports configured to be coupled with the four second T ports, in other words, the one independent circuit module has four receive ports each of which is configured to be coupled with one of the four second T ports.

As an implementation, the radio frequency circuit 20 of the wireless communication device 100 logically includes one transmitter circuit and four receiver circuits.

The radio frequency circuit 20 physically includes two independent circuit modules.

The two independent circuit modules have one transmit port which is configured to be coupled with the one first T port. The two first independent circuit modules have four receive ports each of which is configured to be coupled with one of the three second T ports.

Since low-noise amplifiers (LNA) in receiver circuits can operate simultaneously, due to their low power and low power consumption, mutual influence can be avoided through design. Therefore, multiple LNAs in multiple receiver circuits at the same frequency band can be disposed in the same circuit module. However, when two PAs at the same frequency band operate simultaneously (corresponding to UL MIMO mode), a transmit power will be high, and signals of the two PAs will interfere with each other. In addition, the two PAs will affect heat dissipation efficiency when working at the same time. The radio frequency circuit 20 of the wireless communication device 100 logically includes only one transmitter circuit, and only one PA at the same frequency band operates. Considering this, one or two independent circuit modules are needed.

When the radio frequency circuit 20 physically includes one independent circuit module, an example structure of the corresponding wireless communication device 100 can be referred to FIG. 5A, and the details will be described hereinafter.

Figure 5A:
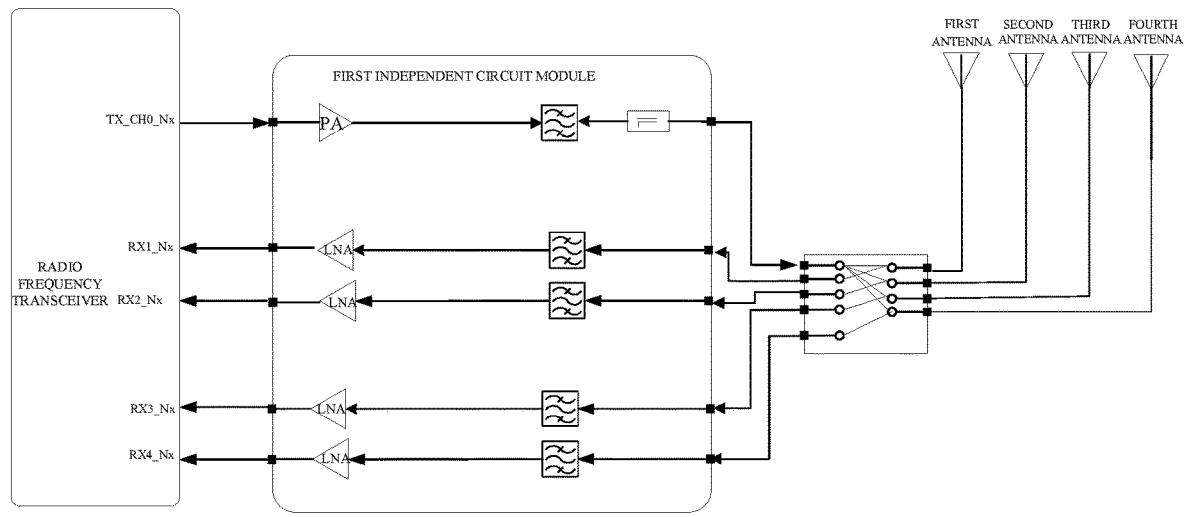
FIG. 5A is a schematic structural diagram illustrating a wireless communication device according to an implementation of the disclosure.

As an implementation, as illustrated in FIG. 5A, the radio frequency circuit 20 physically includes one independent circuit module. The independent circuit module includes one transmitter circuit and four receiver circuits.

When the radio frequency circuit 20 physically includes two independent circuit modules, example structures of the corresponding wireless communication device 100 can be referred to FIG. 5B to FIG. 5E, and the details will be described hereinafter.

Figure 5B:
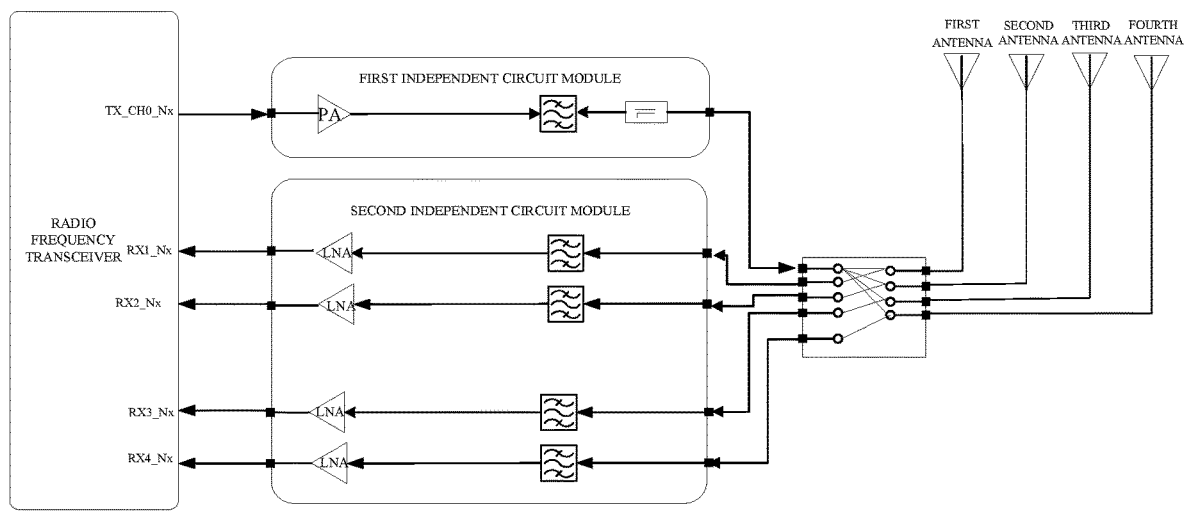
FIG. 5B is a schematic structural diagram illustrating a wireless communication device according to an implementation of the disclosure.

As an implementation, as illustrated in FIG. 5B, the radio frequency circuit 20 physically includes two independent circuit modules. The two independent circuit modules include a first independent circuit module and a second independent circuit module. The first independent circuit module includes one transmitter circuit. The second independent circuit module includes four receiver circuits.

Figure 5C:
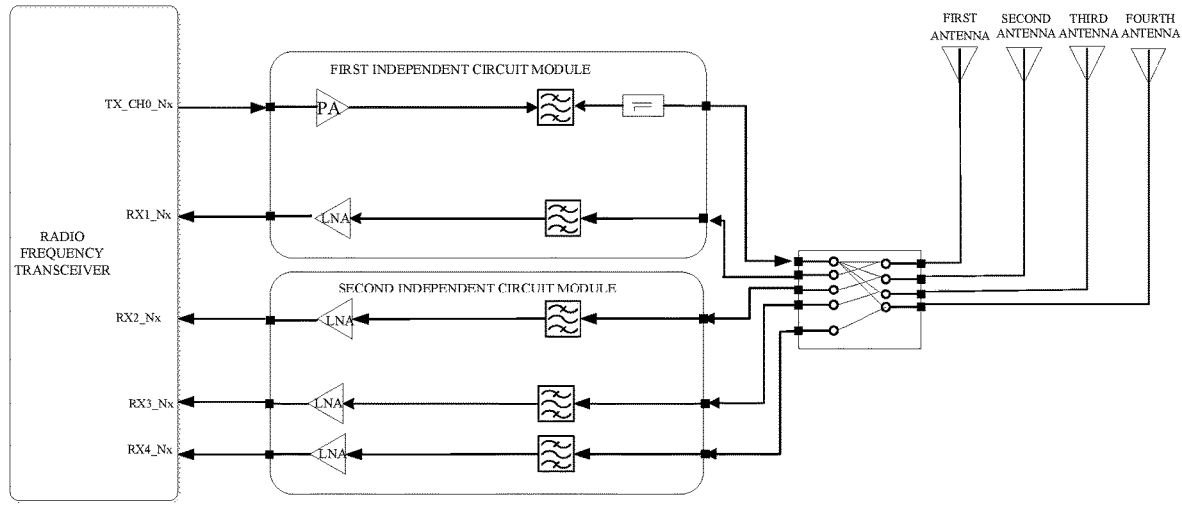
FIG. 5C is a schematic structural diagram illustrating a wireless communication device according to an implementation of the disclosure.

As an implementation, as illustrated in FIG. 5C, the radio frequency circuit 20 physically includes two independent circuit modules. The two independent circuit modules include a first independent circuit module and a second independent circuit module. The first independent circuit module includes one transmitter circuit and one receiver circuit. The second independent circuit module includes three receiver circuits.

Figure 5D:
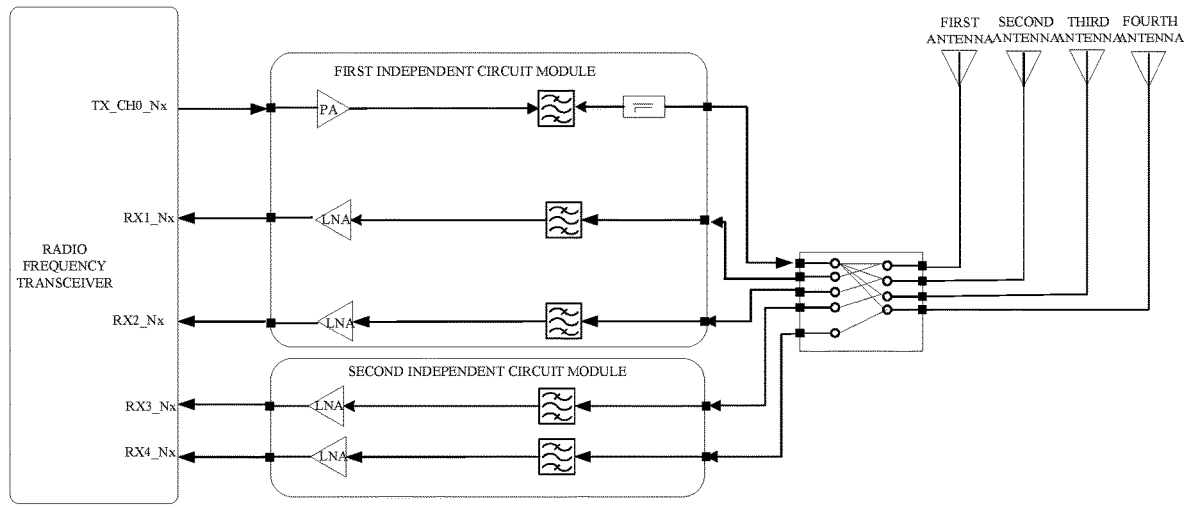
FIG. 5D is a schematic structural diagram illustrating a wireless communication device according to an implementation of the disclosure.

As an implementation, as illustrated in FIG. 5D, the radio frequency circuit 20 physically includes two independent circuit modules. The two independent circuit modules include a first independent circuit module and a second independent circuit module. The first independent circuit module includes one transmitter circuit and two receiver circuits. The second independent circuit module includes two receiver circuits.

Figure 5E:
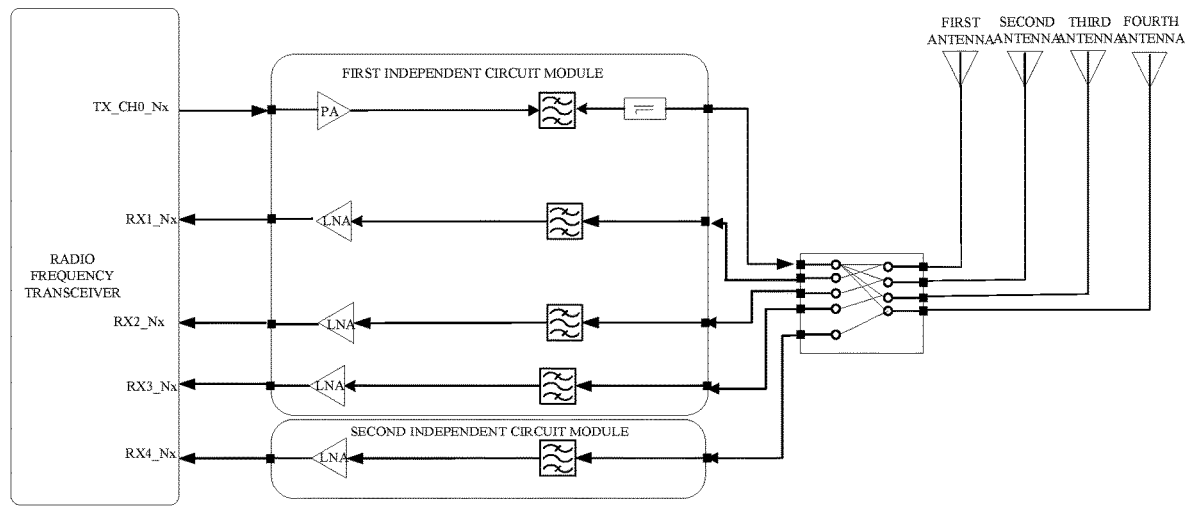
FIG. 5E is a schematic structural diagram illustrating a wireless communication device according to an implementation of the disclosure.

As an implementation, as illustrated in FIG. 5E, the radio frequency circuit 20 physically includes two independent circuit modules. The two independent circuit modules include a first independent circuit module and a second independent circuit module. The first independent circuit module includes one transmitter circuit and three receiver circuits. The second independent circuit module includes one receiver circuit.

The transmitter circuit involved in the implementations of the present disclosure includes a power amplifier (PA), a filter, and a power coupler. The PA is coupled with the filter. The filter is coupled with the power coupler. The power coupler is coupled with the one first T port of the multiway switch 10. The PA is configured to be coupled with the radio frequency transceiver.

The receiver circuit involved in the implementations of the present disclosure includes a LNA and a filter. The LNA is coupled with the PA. The filter is coupled with one second T port of the multiway switch. The LNA is configured to be coupled with the radio frequency transceiver.

The transmit port of the transmitter circuit corresponds to the transmit port of the independent circuit module. The transmit port of the transmitter circuit is configured to be coupled with a corresponding first T port. The receive port of the receiver circuit corresponds to the receive port of the independent circuit module. The receive port of the receiver circuit is configured to be coupled with a corresponding second T port.

As illustrated in FIG. 5A, the radio frequency circuit physically includes one independent circuit module, and the independent circuit module includes a transmitter circuit and four receiver circuits such as a first receiver circuit, a second receiver circuit, a third receiver circuit, and a fourth receiver circuit.

The transmitter circuit has a power coupler coupled with the first T port of the multiway switch 10, and a PA coupled with a TX-CH0-NX port (a first transmit port at the NX frequency band) of the radio frequency transceiver. The first receiver circuit has a filter coupled with one (a first) second T port of the multiway switch 10, and a LNA coupled with a RX1-NX port (a first receive port at the NX frequency band) of the radio frequency transceiver. The second receiver circuit has a filter coupled with another (a second) second T port of the multiway switch 10, and a LNA coupled with a RX2-NX port (a second receive port at the NX frequency band) of the radio frequency transceiver. The third receiver circuit has a filter coupled with an additional (a third) second T port of the multiway switch 10, and a LNA coupled with a RX3-NX port (a third receive port at the NX frequency band) of the radio frequency transceiver. The fourth receiver circuit has a filter coupled with an extra (a fourth) second T port of the multiway switch 10, and a LNA coupled with a RX4-NX port (a fourth receive port at the NX frequency band) of the radio frequency transceiver.

The wireless communication device 100 can control paths between the T ports and the P ports of the multiway switch 10 to switch on and switch off through switch transistors to achieve the preset function. The preset function is transmitting an SRS through the four antennas corresponding to the four P ports in turn by the wireless communication device 100.

The coupling manner of a radio frequency transceiver, a radio frequency circuit 20, and a multiway switch 10 illustrated in FIG. 5B to 5E is similar with that of the radio frequency transceiver, the radio frequency circuit 20, and the multiway switch 10 illustrated in FIG. 5A, and will not be described herein.

It can be understood that, the above-mentioned receiver circuits and transmitter circuits can be implemented in various manners. The implementations of the disclosure are not particularly restricted.

In one possible implementation, the four antennas include a first antenna, a second antenna, a third antenna, and a fourth antenna. These four antennas are all operable at a fifth generation new radio (5G NR) frequency band.

The 5G NR frequency band may include, for example, 3.3 GHz to 3.8 GHz and 4.4 GHz to 5 GHz.

In one possible implementation, the four antennas include a first antenna, a second antenna, a third antenna, and a fourth antenna. The first antenna and the fourth antenna are antennas operable at a long term evolution (LTE) frequency band and a fifth generation new radio (5G NR) frequency band. The second antenna and the third antenna are antennas only operable at the 5G NR frequency band.

The first antenna and fourth antenna are intended to support DL 4×4 MIMO for some frequency bands on LTE terminals. These two antennas are shared with antennas of 5G NR (hereinafter, "shared antennas" for short). The LTE frequency band may include, for example, 1880-1920 MHz and 2496-2690 MHz.

Figure 6:
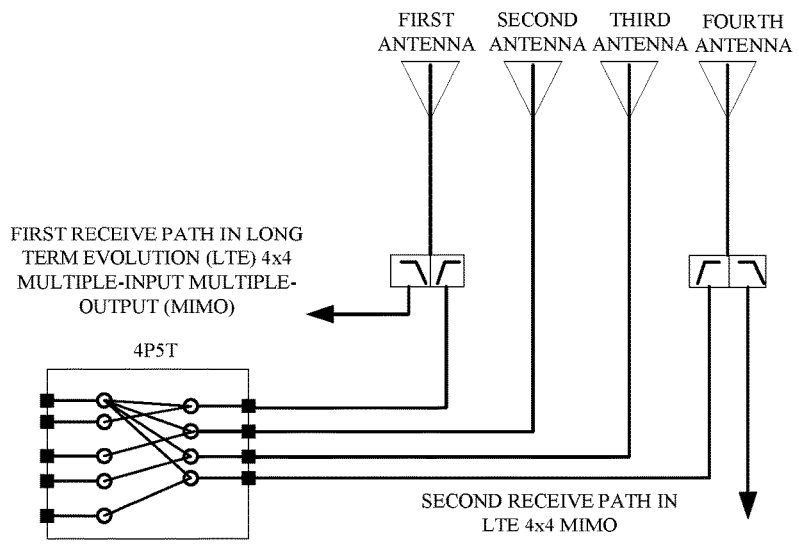
FIG. 6 is a schematic structural diagram illustrating an antenna system of a wireless communication device according to an implementation of the disclosure.

In one possible implementation, as illustrated in FIG. 6, the antenna system further includes a first combiner and a second combiner. The first combiner has a first port configured to be coupled with the first antenna, a second port configured to be coupled with a first receive path in LTE 4×4 multiple-input multiple-output (MIMO) configuration of the wireless communication device 100, and a third port configured to be coupled with a corresponding P port of the multiway switch 10. The second combiner has a first port configured to be coupled with the fourth antenna, a second port configured to be coupled with a second receive path in the LTE 4×4 MIMO of the wireless communication device 100, and a third port configured to be coupled with a corresponding P port of the multiway switch 10.

The LTE 4*4 MIMO is a downlink LTE receive circuit and can be defined as a third receive path. Since the LTE currently has two receive paths, in order to support LTE 4×4 MIMO, the third path and a fourth receive path are added.

According to performance of the four antennas, the wireless communication device 100 will arrange one antenna with better performance for the circuit for PRX (primary receiver), and the antenna will be in a standby state. Moreover, first T ports of the switch having the transmission-reception function can be configured for TX (transmit) and PRX purpose, and thus the antenna can be switched arbitrarily. In this way, there is no need to restrict the coupling between ports of shared antennas.

Figure 7:
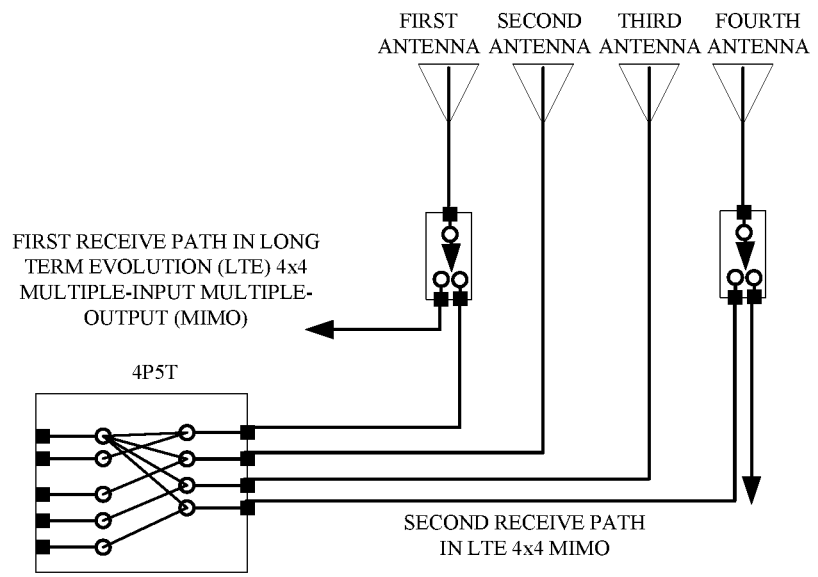
FIG. 7 is a schematic structural diagram illustrating another antenna system of a wireless communication device according to an implementation of the disclosure.

As an implementation, as illustrated in FIG. 7, the antenna system 30 further includes a first single-pole double-throw (SPDT) switch and a second SPDT switch. The first SPDT switch has a first port configured to be coupled with the first antenna, a second port configured to be coupled with a first receive path in LTE 4×4 multiple-input multiple-output (MIMO) configuration of the wireless communication device 100, and a third port configured to be coupled with a corresponding P port of the multiway switch 10. The second SPDT switch has a first port configured to be coupled with the fourth antenna, a second port configured to be coupled with a second receive path in the LTE 4×4 MIMO of the wireless communication device 100, and a third port configured to be coupled with a corresponding P port of the multiway switch 10.

The schemes of the disclosure can be combined or replaced with each other. For example, the antenna system and/or the multiway switch described above can be applied or combined into the radio frequency system and the wireless communication device below. It is to be noted that, "the antenna system and/or the multiway switch" of the disclosure means "the antenna system", "the multiway switch", or "the antenna system and the multiway switch".

Figure 8:
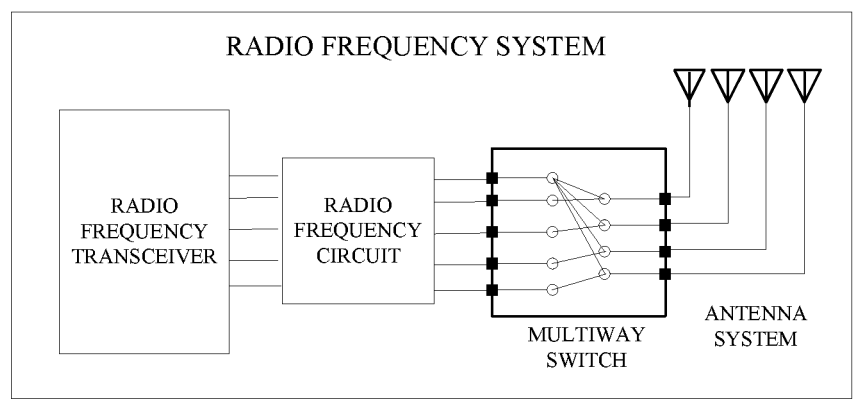
FIG. 8 is a schematic structural diagram illustrating a radio frequency system according to an implementation of the disclosure.

FIG. 8 is a schematic structural diagram illustrating a radio frequency system according to an implementation of the disclosure. The radio frequency system includes an antenna system, a radio frequency circuit, and the multiway switch according to any of the implementations above.

The antenna system includes four antennas.

The multiway switch includes five T ports and four P ports. The five T ports are configured to be coupled with the radio frequency circuit. The four P ports are configured to be coupled with the antenna system. The five T ports include one first T port coupled with all of (that is, fully-coupled with) the four P ports.

The multiway switch is coupled with the radio frequency circuit and the antenna system to implement a preset function of the wireless communication device, and the preset function is a function of transmitting an SRS through the four antennas corresponding to the four P ports in turn.

As an implementation, the five T ports further include four second T ports. Each of the four second T ports is coupled with one corresponding P port of the four P ports. The first T port of the five T ports supports at least a transmission function. The four second T ports other than the first T port of the five T ports support only a reception function.

As an implementation, the radio frequency circuit of the wireless communication device logically includes one transmitter circuit and four receiver circuits. The radio frequency circuit physically includes one independent circuit module. The independent circuit module has one transmit port configured to be coupled with the one first T port. The independent circuit module has receive ports configured to be coupled with the four second T ports.

As an implementation, the independent circuit module includes one transmitter circuit and four receiver circuits. The transmitter circuit has one transmit port configured to be coupled with the one first T port. Each of the four receiver circuits has one receive port configured to be coupled with one of the four second T ports.

As an implementation, the radio frequency circuit of the wireless communication device logically includes one transmitter circuit and four receiver circuits. The radio frequency circuit physically includes two independent circuit modules. The two independent circuit modules have one transmit port configured to be coupled with the one first T port. The two first independent circuit modules have receive ports configured to be coupled with the three second T ports.

Figure 9:
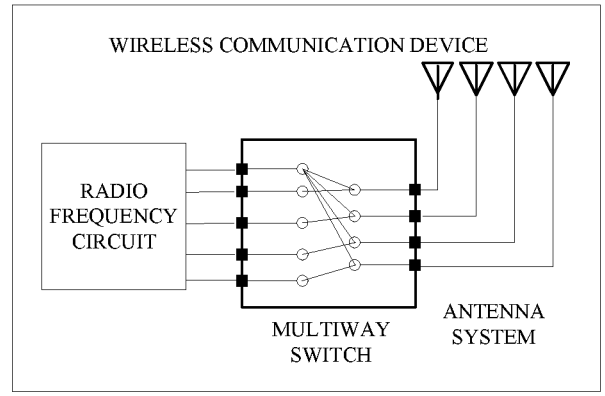
FIG. 9 is a schematic structural diagram illustrating a wireless communication device according to an implementation of the disclosure.

FIG. 9 is a schematic structural diagram illustrating a wireless communication device according to an implementation of the disclosure. The wireless communication device includes an antenna system, a radio frequency circuit, and the multiway switch described in any of the implementations above.

The antenna system includes four antennas.

The multiway switch includes five T ports and four P ports. The five T ports are configured to be coupled with the radio frequency circuit. The four P ports are configured to be coupled with the antenna system. The five T ports include one first T port coupled with all of (that is, fully-coupled with) the four P ports.

The multiway switch is coupled with the radio frequency circuit and the antenna system to implement a preset function of the wireless communication device, and the preset function is a function of transmitting an SRS through the four antennas corresponding to the four P ports in turn.

The wireless communication device includes at least one of an electronic device (such as a terminal device) and a base station.

Figure 10:
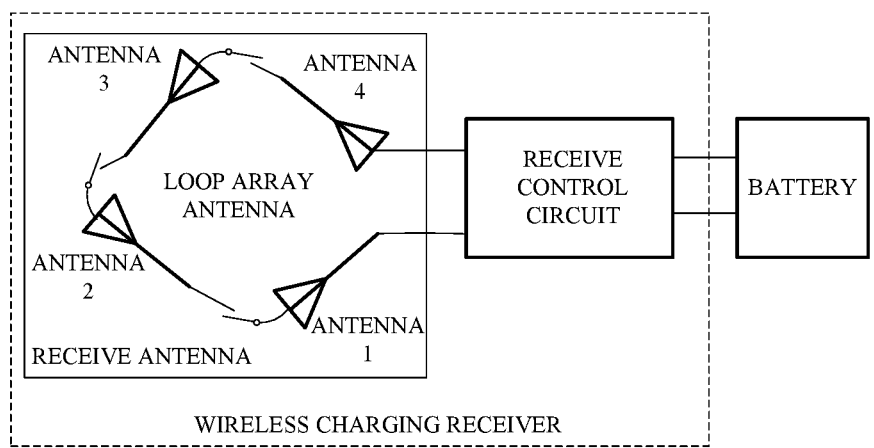
FIG. 10 is a schematic diagram illustrating a wireless charging receiver for multiplexing an antenna of a wireless communication device according to an implementation of the disclosure.

In addition, as illustrated in FIG. 10, the four antennas in the antenna system described in the implementations of the disclosure can also be multiplexed by a wireless charging receiver of the wireless communication device 100. The wireless charging receiver includes a receive antenna and a receive control circuit. The receive antenna matches transmit antennas of a wireless charging transmitter (resonates at the same or similar frequency and transfers energy in a wireless manner in the way of radiative resonant magnetic coupling). The receive control circuit converts, through a loop array antenna, the energy into a direct current (DC) to output to charge a battery. The receive control circuit can dynamically adjust a frequency of the loop array antenna and match the frequency of the loop array antenna with frequencies of the transmit antennas of the wireless charging transmitter to achieve paired charging. As an implementation, the receive control circuit interacts with the wireless charging transmitter in real time on a frequency change range to implement an "exclusive encryption" wireless charging mode.

The receive antenna may be an antenna includes at least one of the four antennas (in the case of multiple antennas, the multiple antennas are strobed via switches).

Figure 11:
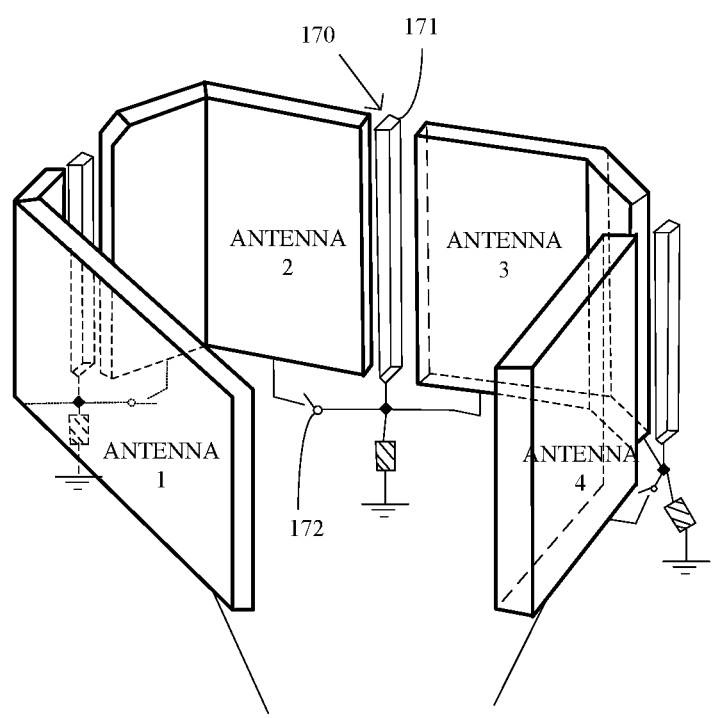
FIG. 11 is a schematic structural diagram illustrating a loop array antenna including four antennas according to an implementation of the disclosure.

For example, as illustrated in FIG. 11, the receive antenna is a loop array antenna including the four antennas described above. The four antennas include an antenna 1, an antenna 2, an antenna 3, and an antenna 4. The antenna 1 and the antenna 4 are operable at both an LTE frequency band and a 5G NR frequency band, while the antenna 2 and the antenna 3 are only operable at the 5G NR frequency band. A port of the antenna 1 and a port of the antenna 4 are used as ports of the loop array antenna. Adjacent antennas are coupled via a gate circuit 170 with an isolation function. The gate circuit 170 includes a spacer 171 and a switch 172, where the spacer 171 is a conductor and the switch 172 is further coupled with a controller. The wireless communication device 100 can conduct the switch 172 of each gate circuit 170 in a wireless charging mode to form a loop array antenna to receive energy. By adding the spacers 171 among the antennas, the gate circuit 170 can reduce mutual coupling among the multiple antennas of the wireless communication device 100 in a normal communication mode, improve isolation among the multiple antennas, and optimize performance of the antennas. On the other hand, the multiple antennas can be coupled in series to form the loop array antenna through the switches 172, so as to better match the transmit antennas to transfer energy. Furthermore, since the antenna 1 and the antenna 4 have capabilities stronger than that of the antenna 2 and the antenna 3, the loop array antenna thus arranged can reduce energy loss in transmission as much as possible.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A radio frequency system, comprising an antenna system, a radio frequency circuit, and a multiway switch;
    the multiway switch comprising five T ports and $2^n$ P ports, the five T ports being configured to be coupled with the radio frequency circuit, the $2^n$ P ports being configured to be coupled with the antenna system, and the five T ports comprising one first T port coupled with all of the $2^n$ P ports; n being an integer;
    the antenna system comprising $2^n$ antennas; and
    the multiway switch being coupled with the radio frequency circuit and the antenna system to implement a preset function of the radio frequency system, and the preset function being a function of transmitting a sounding reference signal (SRS) through the $2^n$ antennas corresponding to the four P ports in turn,
    wherein n=2, and the $2^n$ antennas comprise a first antenna, a second antenna, a third antenna, and a fourth antenna; the first antenna and the fourth antenna are antennas operable at a long term evolution (LTE) frequency band and a fifth genertion new reaio (5G NR) frequency band; and the second antenna and the third antenna are antennas only operable at the 5G NR frequency band.

2. The radio frequency system of claim 1, wherein the five T ports further comprise four second T ports; each of the four second T ports is coupled with one corresponding P port of the $2^n$ P ports; the first T port supports at least a transmission function; and
    the four second T ports support only a reception function.

3. The radio frequency system of claim 2, wherein the radio frequency circuit physically comprises m independent circuit modules, wherein m is an integer and m≥1;
    the m independent circuit modules have one transmit port configured to be coupled with one of the four T ports; and
    each P port of the $2^n$ P ports is configured to be coupled with a corresponding antenna of the $2^n$ antennas.

4. The radio frequency system of claim 3, wherein the radio frequency circuit physically comprises one independent circuit module;
    the independent circuit module has one transmit port configured to be coupled with the one first T port; and
    the independent circuit module has receive ports configured to be coupled with the four second T ports.

5. The radio frequency system of claim 4, wherein the independent circuit module comprises one transmitter circuit and four receiver circuits;
    the transmitter circuit has one transmit port configured to be coupled with the one first T port; and
    each of the four receiver circuits has one receive port configured to be coupled with one of the four second T ports.

6. The radio frequency system of claim 5, wherein the transmitter circuit comprises a power amplifier (PA), a filter, and a power coupler,
    the PA is coupled with the filter, the filter is coupled with the power coupler, the power coupler is coupled with the one first T port of the multiway switch, and the PA is configured to be coupled with a radio frequency transceiver; and
    the receiver circuit comprises a low-noise amplifiers (LNA) and a filter, the LNA is coupled with the PA, the filter is configured to be coupled with one second T port of the multiway switch, the LNA is configured to be coupled with the radio frequency transceiver.

7. The radio frequency system of claim 3, wherein the radio frequency circuit physically comprises two independent circuit modules;
    the two independent circuit modules have one transmit port configured to be coupled with the one first T port; and
    the two first independent circuit modules have receive ports configured to be coupled with the three second T ports.

8. The radio frequency system of claim 7, wherein the two independent circuit modules comprise a first independent circuit module and a second independent circuit module;
    the first independent circuit module comprises one transmitter circuit, and the second independent circuit module comprises four receiver circuits;
    the transmitter circuit has one transmit port configured to be coupled with the one first T port; and
    each of the four receiver circuits has one receive port configured to be coupled with one of the four second T ports.

9. The radio frequency system of claim 7, wherein the two independent circuit modules comprise a first independent circuit module and a second independent circuit module;

the first independent circuit module comprises one transmitter circuit and one receiver circuit, and the second independent circuit module comprises three receiver circuits;
the transmitter circuit has one transmit port configured to be coupled with the one first T port; and
each of the four receiver circuits has one receive port configured to be coupled with one of the four second T ports.

10. The radio frequency system of claim 7, wherein
the two independent circuit modules comprise a first independent circuit module and a second independent circuit module;
the first independent circuit module comprises one transmitter circuit and two receiver circuits, and the second independent circuit module comprises two receiver circuits;
the transmitter circuit has one transmit port configured to be coupled with the one first T port; and
each of the four receiver circuits has one receive port configured to be coupled with one of the four second T ports.

11. The radio frequency system of claim 7, wherein
the two independent circuit modules comprise a first independent circuit module and a second independent circuit module;
the first independent circuit module comprises one transmitter circuit and three receiver circuits, and the second independent circuit module comprises one receiver circuit; and
the transmitter circuit has one transmit port configured to be coupled with the one first T port; and
each of the four receiver circuits has one receive port configured to be coupled with one of the four second T ports.

12. The radio frequency system of claim 1, wherein the antenna system further comprises a first combiner and a second combiner, wherein
the first combiner has a first port configured to be coupled with the first antenna, a second port configured to be coupled with a first receive path in LTE 4×4 multiple-input multiple-output (MIMO) configuration of the radio frequency system, and a third port configured to be coupled with a corresponding P port of the multiway switch; and
the second combiner has a first port configured to be coupled with the fourth antenna, a second port configured to be coupled with a second receive path in the LTE 4×4 MIMO of the radio frequency system, and a third port configured to be coupled with a corresponding P port of the multiway switch.

13. The radio frequency system of claim 1, wherein the antenna system further comprises a first single-pole double-throw (SPDT) switch and a second SPDT switch, wherein
the first SPDT switch has a first port configured to be coupled with the first antenna, a second port configured to be coupled with a first receive path in LTE 4×4 multiple-input multiple-output (MIMO) configuration of the radio frequency system, and a third port configured to be coupled with a corresponding P port of the multiway switch; and the second SPDT switch has a first port configured to be coupled with the fourth antenna, a second port configured to be coupled with a second receive path in the LTE 4×4 MIMO of the radio frequency system, and a third port configured to be coupled with a corresponding P port of the multiway switch.

14. A wireless communication device, comprising an antenna system, a radio frequency circuit, and a multiway switch;
the multiway switch comprising five T ports and $2^n$ P ports, the five T ports being configured to be coupled with the radio frequency circuit, the $2^n$ P ports being configured to be coupled with the antenna system, and the five T ports comprising one first T port coupled with all of the $2^n$ P ports; n being an integer;
the antenna system comprising $2^n$ antennas; and
the multiway switch being coupled with the radio frequency circuit and the antenna system to implement a preset function of the radio frequency system, and the preset function being a function of transmitting a sounding reference signal (SRS) through the $2^n$ antennas corresponding to the four P ports in turn;
wherein the five T ports further comprise four second T ports; eacho of the second T ports is coupled with one corresponding P port of the $2^n$ P ports; the first T port supports at least a transmission function; and the four second T ports support only a receptioin function;
wherein the radio frequency circuit physically comprises m independent circuit modules, wherein m is an integer and m≥1; the m indepent circuit modules have one transmit port configured to be coupled with one of the four T ports; and each P port of the $2^n$ P ports is configured to be coupled with a corresponding antenna of the $2^n$ antennas;
wherein n=2, and the radio frequency circuit physically comprises one independent circuit module; the independent circuit module has one transmit port configured to be coupled with the one first T port; and the independent circuit module has receive ports configured to be coupled with the four second T ports;
wherein the independent circuit module comprises one transmitter circuit and four receiver circuits; the transmitter circuit has one transmit port configured to be coupled with the one first T port; and each of the four receiver circuits has one receive port configured to be coupled with one of ther four second T ports;
wherein the transmitter circuit comprises a power amplifier (PA), a filer, and a power coupler, the PA is coupled with the filter, the filter is coupled with the power coupler, the power coupler is coupled with the one first T port of the multiway switch, and the PA is configured to be coupled with a readio frequency transceiver; and the receiver circuit comprises a low-noise amplifiers (LNA) and a filter, the LNA is coupled with the PA, the filter is configured to be coupled with one second T port of the multiway switch, the LNA is configured to be coupled with the radio frequency transceiver.

* * * * *